(12) United States Patent
Yao

(10) Patent No.: US 10,747,954 B2
(45) Date of Patent: Aug. 18, 2020

(54) SYSTEM AND METHOD FOR PERFORMING TASKS BASED ON USER INPUTS USING NATURAL LANGUAGE PROCESSING

(71) Applicant: Baidu USA LLC, Sunnyvale, CA (US)

(72) Inventor: Xuchen Yao, Seattle, WA (US)

(73) Assignee: BAIDU USA LLC, Sunnyvale, CA (US)

( * ) Notice: Subject to any disclaimer, the term of this patent is extended or adjusted under 35 U.S.C. 154(b) by 75 days.

(21) Appl. No.: 15/799,934

(22) Filed: Oct. 31, 2017

(65) Prior Publication Data

US 2019/0129938 A1 May 2, 2019

(51) Int. Cl.
*G06F 40/30* (2020.01)
*G06F 3/16* (2006.01)
*H04L 12/28* (2006.01)
*G06F 40/40* (2020.01)
*G06F 40/211* (2020.01)

(52) U.S. Cl.
CPC .............. *G06F 40/30* (2020.01); *G06F 3/167* (2013.01); *G06F 40/211* (2020.01); *G06F 40/40* (2020.01); *H04L 12/282* (2013.01)

(58) Field of Classification Search
CPC .... G06F 17/2785; G06F 3/167; G06F 17/271; G06F 17/28; H04L 12/282
See application file for complete search history.

(56) References Cited

U.S. PATENT DOCUMENTS

| | | | | |
|---|---|---|---|---|
| 7,844,861 B2 * | 11/2010 | Hegarty | ............. | G06F 11/3684 714/46 |
| 8,812,429 B2 * | 8/2014 | Forsee, II | ............. | H04M 3/493 370/335 |
| 9,442,693 B2 * | 9/2016 | Dykstra-Erickson | ........ | G06F 3/167 |
| 10,425,807 B2 * | 9/2019 | Hong | ................... | H04W 12/02 |
| 2003/0139925 A1 * | 7/2003 | Anderson | ............. | G10L 15/065 704/231 |
| 2005/0076207 A1 * | 4/2005 | Park | .................... | H04L 12/1836 713/163 |
| 2009/0006099 A1 * | 1/2009 | Sharpe | ................... | G10L 15/22 704/275 |
| 2009/0099849 A1 * | 4/2009 | Iwasawa | ................. | G10L 15/22 704/275 |

(Continued)

*Primary Examiner* — Fariba Sirjani
(74) *Attorney, Agent, or Firm* — Womble Bond Dickinson (US) LLP

(57) ABSTRACT

Embodiments of the invention provide a natural language understanding (NLU) system that performs relatively complex task automations via verbal or voice instructions. Normally, task automations have a trigger condition, and a series of one or more actions that would require a user's selection of an option via manual input. This is because the underlying machine logic requires knowledge and classification capabilities from multiple domains that conventional personal assistants are not capable of. Embodiments of the inventive system and methods provide a solution to this complex task by analyzing trigger and action domains, pinpointing appropriate APIs, extracting corresponding API parameters, and automatically fulfilling API calls for the user. The system is configured to parse natural language commands into API calls. It analyzes both the trigger and action APIs and prompts a user for any missing information if necessary.

19 Claims, 9 Drawing Sheets

600

| Task 601 | Trigger API@Domain 602 | Action API@Domain 603 |
|---|---|---|
| When I get home, turn on my lights | Home address@location service | Turn on light@smart lights |
| Send a text to my wife when I leave my office | Office address@location service | Send text@SMS |
| At sunset set my thermostat to 70 degrees | Weather@weather service; time@time service | Set temerature@thermostat |
| If I add a photo to Instagram, change my room lighting to match its theme | Add photo@Instagram | Set light color@smart lights |
| . . . | . . . | . . . |

(56) References Cited

U.S. PATENT DOCUMENTS

| | | | |
|---|---|---|---|
| 2012/0016678 A1* | 1/2012 | Gruber | G10L 15/22 |
| | | | 704/275 |
| 2012/0260263 A1* | 10/2012 | Edoja | G06Q 30/02 |
| | | | 719/313 |
| 2014/0172953 A1* | 6/2014 | Blanksteen | H04W 4/02 |
| | | | 709/203 |
| 2014/0207469 A1* | 7/2014 | Dykstra-Erickson | |
| | | | G06F 3/167 |
| | | | 704/275 |
| 2015/0348551 A1* | 12/2015 | Gruber | G10L 15/1815 |
| | | | 704/235 |
| 2016/0217785 A1* | 7/2016 | Kennewick | G10L 15/1822 |
| 2017/0017519 A1* | 1/2017 | Khan | G06F 9/4881 |
| 2017/0180209 A1* | 6/2017 | Shevenell | H04L 41/12 |
| 2017/0186429 A1* | 6/2017 | Giuli | G06F 16/3329 |
| 2017/0315684 A1* | 11/2017 | Dykstra Erickson | |
| | | | G06F 3/0689 |
| 2018/0006872 A1* | 1/2018 | Johnson | H04L 41/0266 |
| 2018/0053501 A1* | 2/2018 | Hilal | G06F 17/271 |
| 2018/0234841 A1* | 8/2018 | Hong | G06F 3/04842 |

* cited by examiner

| Domain 501 | API(s) 502 |
|---|---|
| Text | SMS, Skype, Wechat |
| Twitter | |
| Location Service | |
| Weather Service | |
| Smart Lights | |
| ... | ... |

| Task 601 | Trigger API@Domain 602 | Action API@Domain 603 |
|---|---|---|
| When I get home, turn on my lights | Home address@location service | Turn on light@smart lights |
| Send a text to my wife when I leave my office | Office address@location service | Send text@SMS |
| At sunset set my thermostat to 70 degrees | Weather@weather service; time@time service | Set temerature@thermostat |
| If I add a photo to Instagram, change my room lighting to match its theme | Add photo@Instagram | Set light color@smart lights |
| ... | ... | ... |

SYSTEM AND METHOD FOR PERFORMING TASKS BASED ON USER INPUTS USING NATURAL LANGUAGE PROCESSING

TECHNICAL FIELD

Embodiments of the invention relate generally to task management of devices. More particularly, embodiments of the invention relate to performing complex tasks based on human intents.

BACKGROUND

Using voice commands to query and control external devices, process or services has become a reality thanks to the rise of digital personal assistant applications. However, these applications are still very limited in terms of functionalities, abilities, and degrees of automation.

In the open world of Internet of Things (IoT), all devices and services are connected and most of them are programmatically accessible, by exposed application programming interfaces (APIs) for basic operations such as reading and executing, or more advanced ones such as push notifications for time critical missions. Making these APIs accessible and interconnected via natural speech or text without requiring much, if any, programming knowledge from users is one of the goals of next generation human computer interaction efforts. Challenges arise when a system needs to identify multiple intentions from various domains in a single complex sentence. It is also challenging to fulfill these complex natural language instructions with underlying API calls.

There are services supporting these tasks, however, all of them require a long process of users specifying exactly what services are intended and a relatively significant and burdensome amount of configuration. For instance, a conventional service requires a process of several steps for a user to fill out to generate a desired automatic rule. Usually this process takes minutes to tens of minutes.

On the other hand, the desire to automate these tasks and make them available to general users without requiring significant and in some cases expert programming knowledge has been a motivation for the development of various personal assistant applications and devices (e.g., Google Home, Apple Siri, Microsoft Cortana, Amazon Echo), all of which provide a text or speech interface to perform simple tasks for users. However, the abilities of these personal assistant applications are still very limited to both very simple commands and the relatively small ecosystem built by their providers.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of a domain/API mapping table according to one embodiment.

FIG. 6 is a block diagram illustrating an example of task configuration data structure according to one embodiment.

DETAILED DESCRIPTION

Figure 1:
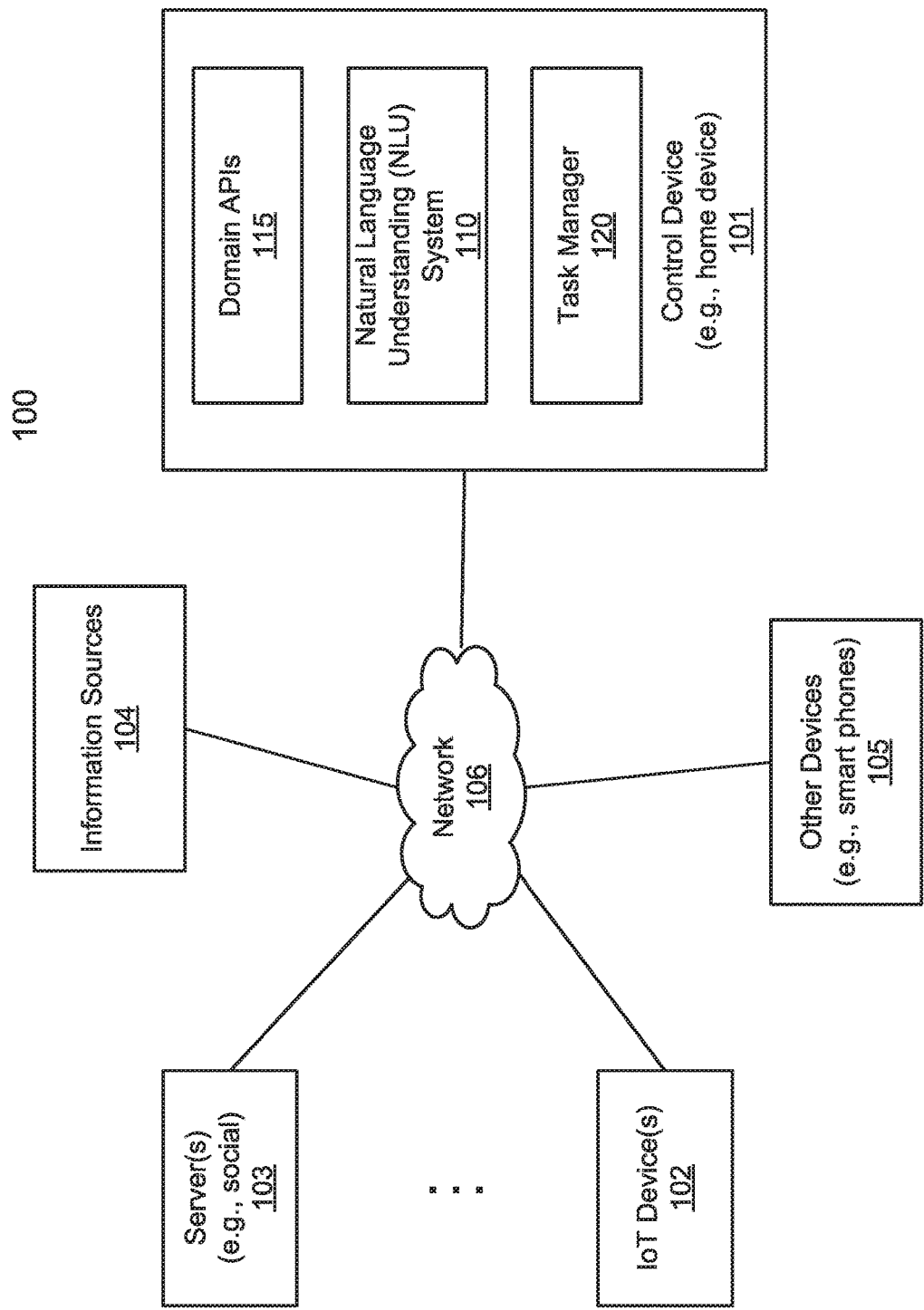
FIG. 1 is a block diagram illustrating a network configuration according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Accordingly, embodiments of the invention provide a natural language understanding (NLU) system that performs relatively complex task automations via verbal or voice instructions. Normally, task automations have a trigger condition, and a series of one or more actions that would require a user's selection of an option via manual input. This is because the underlying machine logic requires knowledge and classification capabilities from multiple domains that conventional personal assistants are not capable of. Embodiments of the inventive system and methods provide a solution to this complex task by analyzing trigger and action domains, pinpointing appropriate APIs, extracting corresponding API parameters, and automatically fulfilling API calls for the user. The system is configured to parse natural language commands into API calls. It analyzes both the trigger and action APIs and prompts a user for any missing information if necessary.

According to one embodiment, in response to an input text originated from a user, a natural language processing (NLP) operation is performed on the input text to determine a task to be performed in response to a condition. The text input may be received from an email or a text. Alternatively, the text input may be converted using speech recognition from a recorded audio stream or a voice command spoken by a user. A first domain associated with the condition and a second domain associated with the task are determined based on the NLP operation. A first API associated with the first domain (e.g., trigger API) and a second API associated with the second domain (e.g., action API) are determined. In response to a notification received from a first application via the first API, the notification is examined to determine whether the condition has been satisfied. If the condition has been satisfied, a control command is generated and transmitted to a second application via the second API. The control command is to instruct the second application to perform the task.

In one embodiment, the first domain associated with the condition and the second domain associated with the task may be determined using a domain predictive model, which may be created using machine learning. In searching for an API of a particular domain, a search is performed in a domain-to-API (domain/API) mapping data structure based on that particular domain. The domain/API mapping table includes a number of mapping entries and each mapping entry maps a particular domain to one or more APIs. If there are multiple APIs corresponding to a particular domain, the user is prompted to select one of the APIs. Similarly, if a command parameter is missing or cannot be ascertained, the user is prompted to provide the missing command parameter.

FIG. 1 is a block diagram illustrating a network configuration according to one embodiment. Referring to FIG. 1, network configuration 100 includes an electronic or control device 101 communicatively coupled to a variety of devices over a network 106, including IoT device(s) 102, server(s) 103, one or more information sources 104, and other devices 105 (e.g., mobile devices). Control device 101 can be a home device or IoT device such as a Google Home device, Amazon Echo device. Control device 101 can also be any mobile device (e.g., smart phones, tablets) with a mobile application running therein (e.g., Apple Ski, Microsoft Cortana). IoT devices can be any device that is accessible via the Internet, such as, for example, smart lights, thermostats). Server 103 can be any server such as social networking sites (e.g., Twitter, Facebook). Information sources 104 can be any server or servers that can provide information or perform a particular process. For example, information source 104 can be an image search facility having an image search engine to search an image of a particular object. Information source 104 can be a location service provider, weather service provider, time service provider, etc. Other devices 105 may be personal devices such as mobile phones, laptops, tablets. Network 106 can be any type of networks such as a local area network (LAN), a wide area network (WAN) such as the Internet, or a combination thereof, wired or wireless.

In one embodiment, control device 101 includes an NLU system 110, a set of APIs 115, and a task manager 120. In response to an input text or text stream representing a sentence or phrase spoken by a user, NLU system 110 is configured to perform an NLP operation on the text stream to determine a subject matter described by the text stream. The text stream may be generated from a voice command issued by the user using a speech recognition process. In one embodiment, the NLP operation may detect that the text stream describes a task to be performed in response to a condition or the text stream describes multiple tasks to be performed.

Based on the NLP operation, a first domain associated with the condition and a second domain associated with the task are determined. A domain may simply be a name or term mentioned in the input text. Alternatively, a domain may be determined based on the NLP operation that understands the user's intent. Once the first domain and the second domain are determined, NLU system 110 determines a first API associated with the first domain and a second API associated with the second domain, where the first API and second API may be a part of APIs 115. Based on the first and second APIs, task manager 120 is configured to communicate with other applications via the first and second APIs to perform the requested task.

The first API is referred to as a trigger API and the second API is referred to as an action API. Task manager 120 is configured to monitor the trigger API to detect any notification or event, for example, in a form of a message or signal, received from a first application via the first API. In response to a notification or event received from the trigger API, task manager 120 and/or NLU system 110 examines the notification or event to determine whether the condition specified in the input text has been satisfied. If it is determined that the condition has been satisfied, task manager 120 transmits a control command, for example, in a form of a request, to a second application via the second API. The control command includes information or parameter(s) to request the second application to perform the task specified by the input text.

With the intelligent NLU system 110, complex commands can be understood to perform complex tasks. As described above, conditional tasks can be performed by analyzing the input text to determine a condition and a task to be performed in response to the condition that has been satisfied. Alternatively, NLU system 110 can also determine multiple conditions and/or actions specified in the input text. Task manager 120 configures multiple APIs corresponding to the multiple tasks and transmits multiple commands via the APIs, for example, via network command output 208 of FIG. 2, to instruct multiple applications to perform their respective task(s). Note that although domain APIs 115, NLU system 110 and task manager 120 are shown as a part of control device 101, they can be located in the cloud and are communicatively coupled to control device 101. For example, control device 101 can be a mobile phone device, while domain APIs 115, NLU system 110, and task manager 120 may be part of network appliance or IoT devices on the cloud that are communicatively coupled to control device 101.

Figure 2:
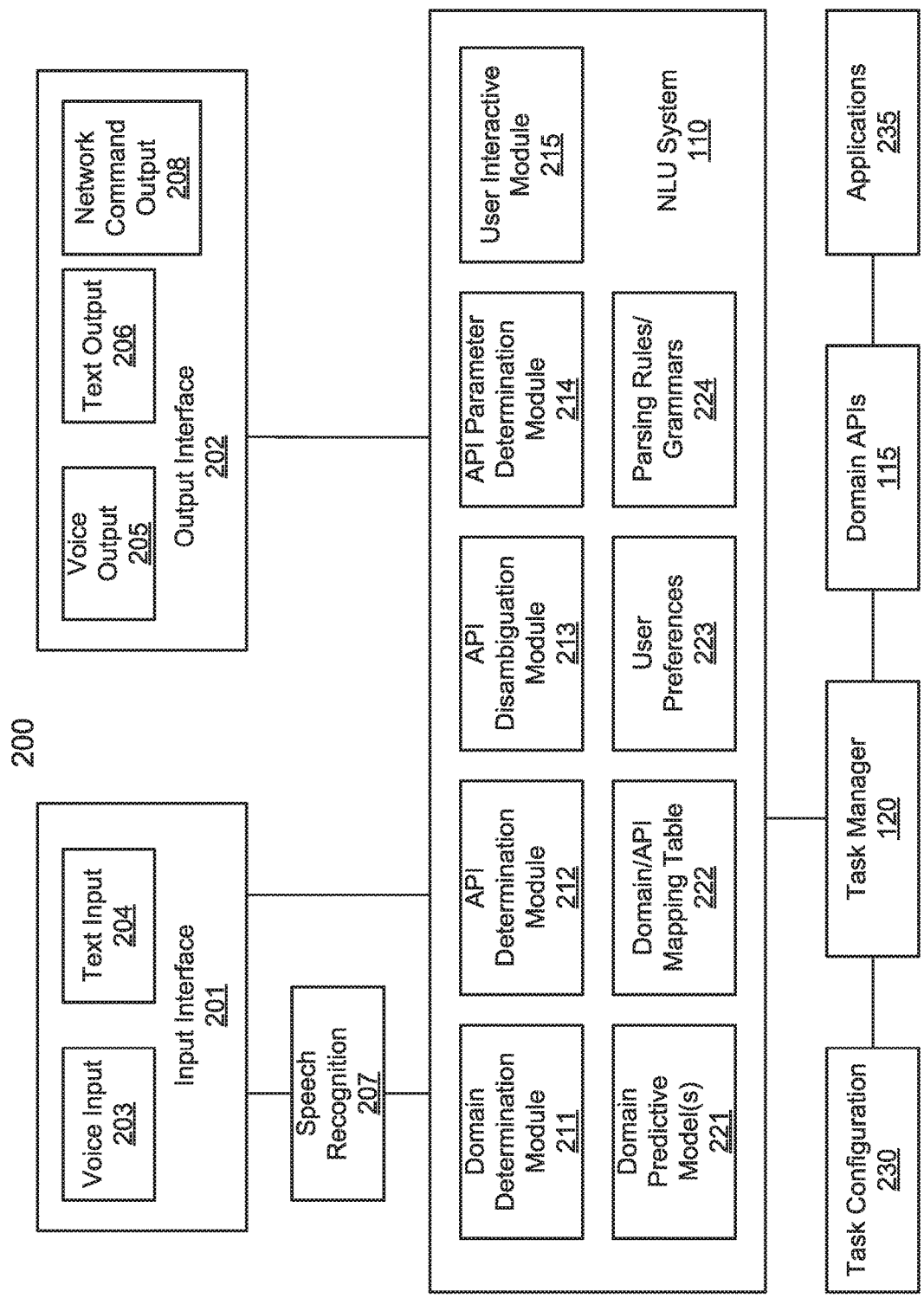
FIG. 2 is a block diagram illustrating an example of a control device to perform tasks based on user inputs according to one embodiment.
Figure 3:
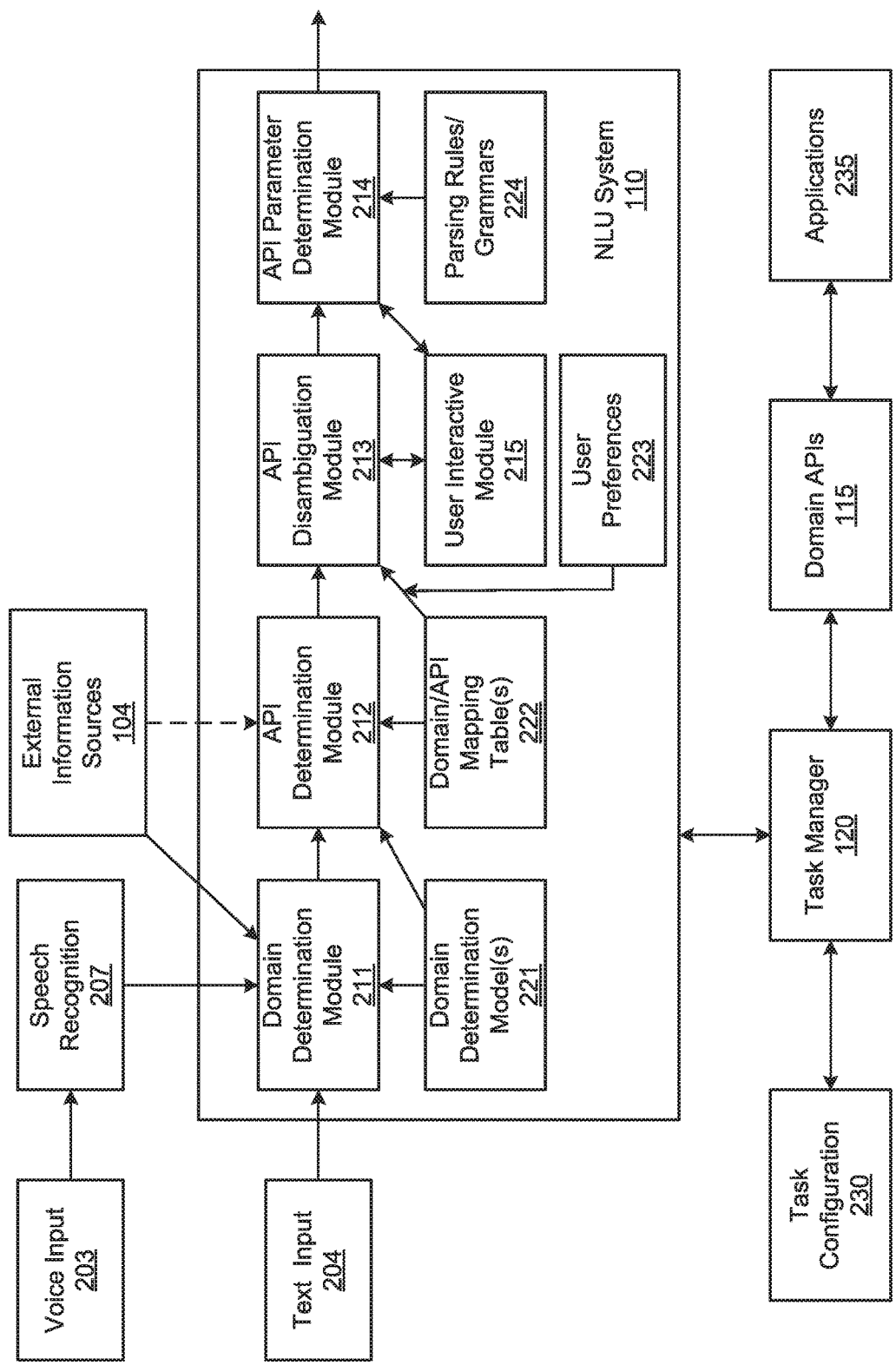
FIG. 3 is a processing flow diagram illustrating a processing flow to perform tasks based on user inputs according to one embodiment.

FIG. 2 is a block diagram illustrating an example of a control device to perform tasks based on user inputs according to one embodiment. FIG. 3 is a processing flow diagram illustrating a processing flow to perform tasks based on user inputs according to one embodiment. System 200 may be implemented as a part of control device 101. Referring to FIGS. 2 and 3, system 200 includes, but is not limited to, NLU system 110 coupled to an input interface 201 and an output interface 202, and task manager 120, which may be implemented in software, hardware, or a combination thereof. For example, at least some of the components of NLU system 110 and task manager 120 may be loaded into a memory (e.g., random access memory or RAM such as dynamic RAM or DRAM) and executed by one or more processors (e.g., microprocessors such as central processing units or CPUs, or general-purpose processing units or GPUs) of system 200 (not shown).

In one embodiment, input interface 201 includes a voice or audio input 203 and text input 204. Voice input 203 may be a part of a microphone. Voice input 203 may also receive a recorded audio stream from a user. Text input 204 may receive text from an input and output (IO) interface of system 200 such as a keyboard. Text input 204 can be coupled to any communication interface that is capable of receiving texts, such as, for example, an API to emails, chat, short messaging service (SMS), social media, etc. Input interface 201 may further include or communicate with a speech recognition module 207 to perform a speech recognition of an audio stream received via voice input 203, such as, performing a speech-to-text conversion to transcribe a voice stream into a text stream. Similarly, output interface 202 includes voice output 205 and visual output 206. Voice output 205 may include or be coupled to a speaker. Visual output 206 may include or be coupled to a display that can display information. Visual output 206 may be coupled to any communication mechanism that can transmit visual information (e.g., text, images) to another device to be viewed by a user (e.g., email, chat, SMS, social media).

In one embodiment, NLU system 110 includes, but is not limited to, domain determination module or detector 211, API determination module or detector 212, API disambiguation module 213, API parameter determination module 214, and user interactive module 215. These modules 211-215 may be integrated into fewer modules. For example, domain determination module 211 and API determination module 212 may be integrated into an integrated module. Similarly, API disambiguation module 213 and API parameter determination module 214 may also be integrated into an integrated module.

In response to a text input, domain determination module 211 is configured to determine one or more domains associated with the input text using an NLP process. The input text may be received as a part of text input 204 or from voice input 203 converted by speech recognition 207. In one embodiment, domain determination module 211 determines one or more domains using a domain predictive model 221, which is configured to predict a domain based on a phrase, term, or sentence of the input text. Domain predictive model 211 may be created using machine learning based on a large amount of known phrases, terms, and sentences spoken or provided by a large amount of users, as well as the known intents associated with the phrases, terms, and sentences. For example, when a user says "when I get home turn on my lights," domain determination module 211 may determine at least two domains: 1) location service concerning the home of the user, and 2) smart lights.

Based on the domains determined by domain determination module 211, API determination module 212 is configured to determine an API for each of the domains. In the above example, API determination module 212 may determine a first API associated with a location service (e.g., GPS application) and a second API associated with the smart lights. The first API may be utilized to determine a current location of system 200 or a location of a user's specified mobile device. The second API may be utilized to control the smart lights (e.g., turning on, turning off, controlling colors and emitting patterns of the smart lights).

API determination module 212 may perform a search in an API database based on a domain to obtain an API corresponding to the domain. Specifically, according to one embodiment, API determination module 212 performs a lookup operation in domain/API mapping table 222 based on a domain identifier (ID) determined by domain determination module 211. An example of domain/API mapping table 222 is shown in FIG. 5 according to one embodiment. Referring to FIG. 5, domain/API mapping table 500 may represent domain/API mapping table 222 of FIGS. 2 and 3. Domain/API mapping table 500 contains a number of mapping entries. Each mapping entry maps a particular domain 501 to one or more APIs 502. In response to a domain ID, API determination module 212 searches domain/API mapping table 500 based on the domain ID to locate a mapping entry having domain field 501 matching the domain ID. One or more APIs or API IDs are then obtained from API field 502 of the matching entry.

Note that domain predictive model 221 and domain/API mapping table 222 may be implemented as one or more domain/API predictive models to predict or determine the domains and/or the APIs. Both domain determination module 211 and API determination module 212 can utilize machine learning techniques to help classifying input text, with learned machine learning module as a part of domain or API predictive model 221. These techniques can include either generative or discriminative models. These techniques can also provide a ranking mechanism to rank the priorities or confidence of the domains and/or APIs.

The domain determination module 211 and API determination module 212 can operate in series or in parallel. The architecture of these two modules determines how to utilize the domain predictive model 221 and/or API mapping table 222. For instance, when configured in series, the API determination module 212 may trust the results from domain determination module 211. In this case, the search space for trained machine learning model 221 or domain/API mapping table 222 is limited to the domains determined by domain determination module 211, effectively allowing better confidence since the choices of classification labels are much smaller. When modules 211 and 212 are configured in parallel, both the API determination module 212 and domain determination module 211 will propose their own classification result. Compatible results may increase classification confidence, while incompatible results may need further clarification. The architecture can also be hybrid: using both cascading and parallel configurations. In this case the optimal configuration can be obtained by learning from classification errors from training data.

Note that a domain may be associated with multiple APIs. For example, a texting domain may be associated with multiple texting APIs, because there may be multiple ways to send a text, including SMS, chat application (e.g., Skype, Wechat), iMessage, etc. Similarly, a searching domain may be associated with multiple search engines such as Baidu, Google, Microsoft Bing, and Yahoo. Thus, there may be ambiguities amongst the APIs associated with the same domain based on the mapping. Similarly, multiple vendors may provide location services or weather services.

Referring back to FIGS. 2 and 3, if there is ambiguity existed, API disambiguation module 213 may be invoked to resolve the ambiguity. In one embodiment, API disambiguation module 213 may invoke user interactive module 215 to interact with the user to obtain a user selection of one of the APIs. User interactive module 215 may present the choices via output interface 202, either in a verbal form and/or a visual form. The user is prompted to select one of the APIs. For example, when a user requested to be notified, the system can choose to push a notification to the user's cellphone if this is the action always desired. Other options include sending SMS messages, email, phone call, or alarm, etc. According to another embodiment, API disambiguation module 213 may automatically select one of the APIs based on user preferences 223. User preferences 223 may be configured by the user via a configuration interface (not shown). Alternatively, user preferences 223 may be generated and updated based on the user interactions of the user from time to time.

Once the APIs have been determined, the parameters of the APIs need to be determined in order to invoke the corresponding applications via the APIs. According to one embodiment, API parameter determination module 214 is invoked to determine the parameters for each of the APIs determined by API determination module 213. API parameter determination module 214 parses the input text into a structured format that can be understandable by computers. API parameter determination module 214 can utilize a parser with the parsing grammar specified in parsing rules or grammars 224.

In one embodiment, parsing grammar 224 encodes domain knowledge about parameters for each API call from each domain. Parsing grammar 224 captures this knowledge from domains in two ways. First, parsing grammar 224 may learn from existing data if abundant annotated text is available. Second, parsing grammar 224 may start from scratch by using a few grammar rules, then bootstrap with more user data and learn a statistical model. In any cases, the goal of parsing grammar is to be robust against noise and variations in input text while still extracting necessary information to complete an API.

In the above example when the user says "when I get home turn on my lights," at least one of the parameters will be the address of user's home. In this example, parameter determination module 214 parses the input text in view of the rules or grammars 224 to determine that a home address of the user is needed as a parameter. Typically, the home address should have been previously registered and stored either under the user contact, address book, or user profile. Parameter determination module 214 may communicate with proper components to obtain the home address of the user, for example, via a corresponding API. For example, parameter determination module 214 may access the address book or contacts of the user to obtain the home address of the user via a particular API that can be utilized to access the address book or contacts.

If it is determined that the home address of the user cannot be obtained, API parameter determination module 214 may invoke user interactive module 215 to prompt the user to provide the home address. Once the user provides the missing parameter, in this example, the home address, the related information store or database will be updated based on the parameter provided by the user. In this example, API parameter determination module 214 may communicate with the address book or contacts via the corresponding API to update the home address of the user. Alternatively, user preferences 223 may be updated to store the home address of the user.

When API information (e.g., an API and the corresponding API parameter(s)) is successfully determined based on input, the API information is sent to corresponding device or service, in this example, task manager 120. The task manager 120 may run the API on a device, such as user's own cellphone, tablet, or computer, or from a service, such as email, calendar, weather, date and time, etc. The implementation of these API calls can depend on remote API calls provided by original API providers, or third-party software or services that have implemented the same functionality. In addition, to confirm with user, the system can provide a voice feedback via voice output 205 if a speaker is present, and/or a visual feedback via visual output 206 if a display is present. The feedback includes enough details to notify the user with what the system has understood and options to cancel/modify API calls should the user desires.

The task configuration and their APIs are then stored in task configuration database 230. An example of task configuration database 230 is shown in FIG. 6 according to one embodiment. Task manager 120 then monitors the API events and sends control commands to proper APIs to perform the requested tasks in response to the proper API events.

Figure 4:
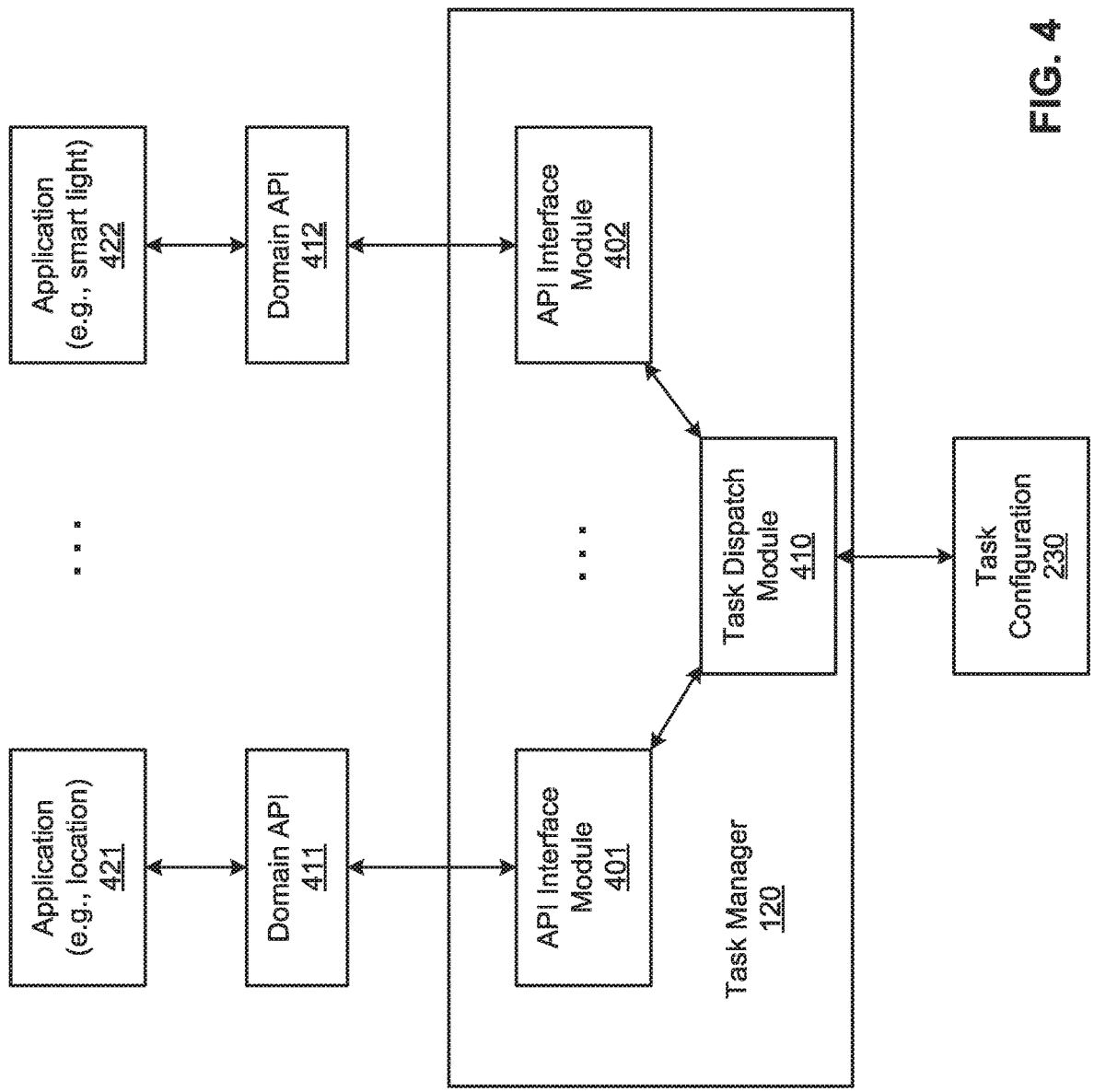
FIG. 4 is a block diagram illustrating an example of a task manager according to one embodiment.

FIG. 4 is a block diagram illustrating an example of a task manager according to one embodiment. Referring to FIG. 4, task manager 120 includes a list of API interface modules 401-402 and each API interface module corresponds to one of domain APIs 411-412. Each of API interface modules 401-402 is communicatively coupled to one of applications 421-422 via corresponding one of domain APIs 411-412. Although there are only two domain APIs 411-412 and two applications 421-422, more domain APIs and their respective applications, as well as corresponding API interface modules can also be implemented.

With respect to the above example of "when I get home turn on my lights," after the analysis described above, at least two domain APIs are identified: 1) location service API and 2) smart light API, which may be stored in task configuration database 230. In this example, application 421 is a location service application that provides location services and application 422 is a smart light application that can control the smart lights. Domain API 411 is a location service API while domain API 412 is a smart light API. As described above, the smart lights are turned on only when the user arrives home. Thus, API interface module 401 is configured to communicate with location service application 421 via API 411 to determine the location of the user, for example, based on GPS information obtained from user's mobile phone.

In one embodiment, API interface module 401 sends a request to application 421 requesting a callback notification if the user's mobile phone is within a predetermined proximity of user's home. Alternatively, API interface module 401 periodically poll application 421 via API 411 to request a current user's location and then determines whether the user current location is within the predetermined proximity of user's home. In response to determining that the user arrives home, task dispatch module 410 dispatch a command to API interface module 402 to instruct API interface module 402 to perform the previously configured task, in this example, turning on the lights at user's home. In response to the command, API interface module 402 is configured to formulate proper instructions compatible with application 422 (e.g., smart light control application) and sends the instructions to application 422 via API 412 to allow application 422 to perform the task.

Note that task manager 120 and/or NLU system 110 may be running within a mobile device of a user or within a home device associated with the user. If task manager 120 is a part of a home device, application 421 may be a remote mobile application running within a mobile device of the user. If task manager 120 is a part of a mobile device of the user, application 421 may be an internal application (e.g., an application associated with a GPS sensor). Similarly, if task manager 120 is a part of a home device of a user, application 422 may be an internal application of the home device. If task manager 120 is a part of a mobile device of the user, application 422 may be a remote application, for example, running within a smart light controller. Other configurations may exist.

Specifically, in response to a notification event received via API 411, task dispatch module 410 performs a lookup operation in a task configuration database, such as, task configuration table as shown in FIG. 6. Referring to FIG. 6, in response to an event notification received via API 411, a lookup operation is performed in table 600, for example, based on a task ID 601 associated with the event notification, to locate an entry matching the task ID. Assuming the notification event indicates that a predetermined condition (e.g., user is within a predetermined proximity of user's home) has been satisfied as indicated in field 602, the API and its parameter information 603 to perform a task are obtained from the matching entry. A request to perform the task is then transmitted to API interface module 402 to generate a proper command and parameters. API interface module 402 then transmits the command to application 422 via API 412 to perform the task. Thus, API 411 is referred to as a trigger API that triggers an action to be performed via API 412, which is referred to as an action API.

Note that API interfaces 401-402 and task dispatch module 410 may be integrated into an integrated module. In another embodiment, API interface modules 401-402 may include functionalities of applications 421-422 respectively. Applications 421-422 may be running within a mobile phone of a user that can directly communicate with an external location services and smart lights in the above example. The user can directly speak to its mobile phone and transcribed text can be captured by NLU system 110 and processed by task manager 120 as described above. The above described techniques can be applied to more complex situations such as multiple triggering conditions and/or multiple actions to be performed in response to one or more triggering conditions.

For example, extended from the above example, a user may say "when I get home, turn on my lights and send a text to my wife that I arrived home." In this particular example, there is one trigger API for location services, a first action API to turn on the smart lights, and a second action API to send a text to user's wife. The techniques described above can be utilized to determine the APIs, as well as their corresponding parameters (e.g., home address, wife's phone number or chat application). When the associated condition, in this example, arriving home, is satisfied, two communication sessions will be established via two different action APIs. Similarly, the user could say "when I get home, turn on my lights and turn my thermostat to 70 degrees." An action API will be identified to communicate with a programmable thermostat.

One or more actions can also be performed in response to multiple trigger API calls. For example, a user can say "when I get home and at sunset, turn on my lights and turn my thermostat to 70 degrees." In this situation, there will be at least two trigger API calls: 1) location service, 2) weather service, and/or 3) time service. There will be at least two action API calls: 1) smart lights and 2) thermostat.

According to one embodiment, in some situations, if there is an API parameter that cannot be determined, the system may invoke an external help by accessing an external information provider to obtain the information that is helpful to determine the missing API parameter. For example, a user may say "if I add a photo to Instagram, change my room lights to match its theme or subject matter." In this example, there is a trigger API of Instagram to determine a new photo has been added and an action API to configure smart lights. However, one of the parameters associated with the smart lights in this example will be: 1) color and/or 2) emitting or flashing patterns. In order to determine the parameters of the smart lights, the theme or subject matter of the photo has to be determined. The system may or may not be equipped with such a capability to determine the theme or subject matter of a photo (e.g., indoor vs. outdoor, city vs. rural area, or sunny day vs. raining day). Accordingly, the system can invoke an external or third-party service provider (e.g., information provider system 104) to perform an image analysis on the photo via a separate API communication protocol.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
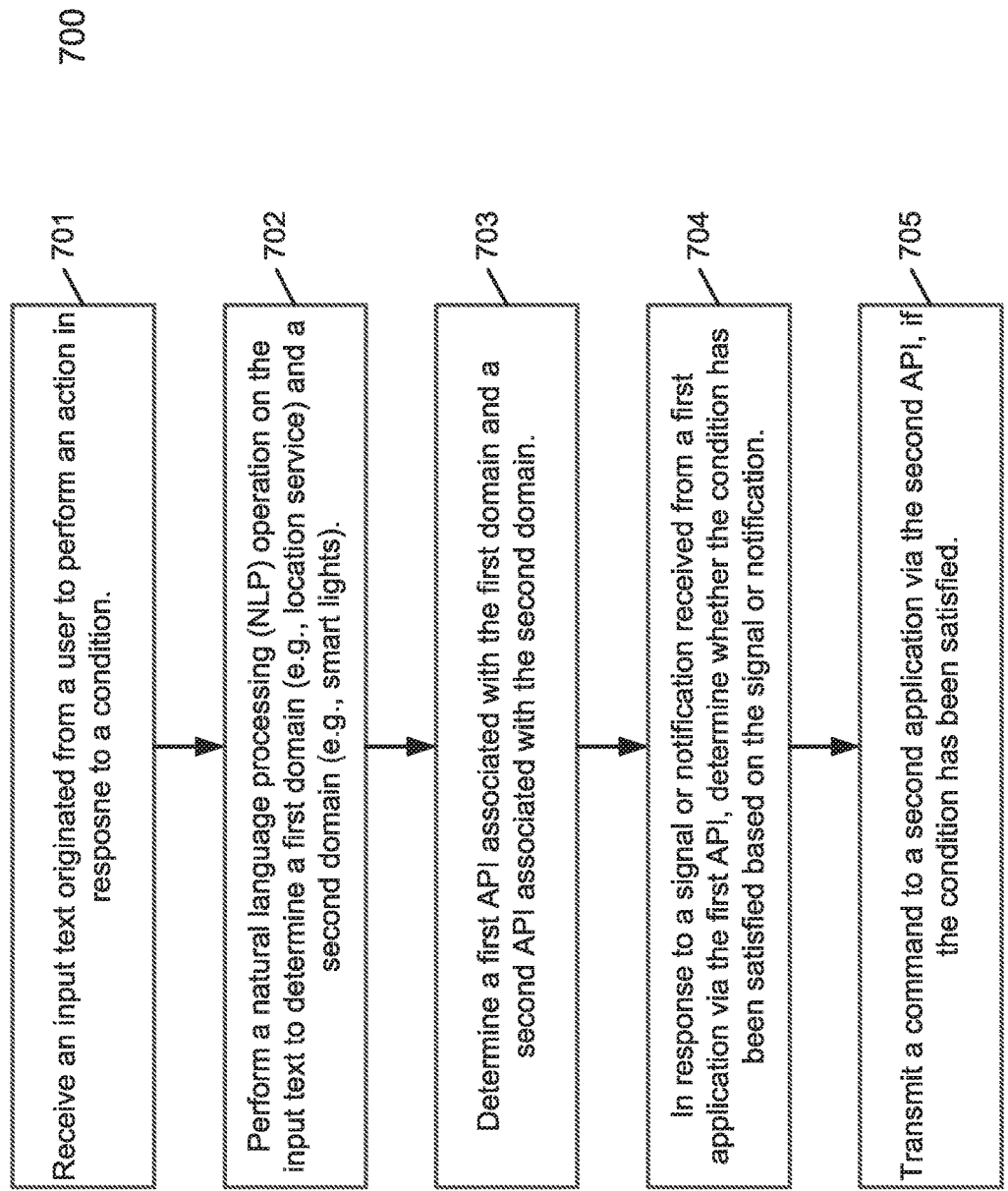
FIG. 7 is a flow diagram illustrating a process of performing tasks based on user inputs using natural language processing according to one embodiment.

FIG. 7 is a flow diagram illustrating a process of performing tasks based on user inputs using natural language processing according to one embodiment. Process 700 may be performed by processing logic which may include software, hardware, or a combination thereof. For example, process 700 may be performed by system 200 of FIG. 2. Referring to FIG. 7, in operation 701, processing logic receives an input text originated from a user to perform an action in response to a condition. In operation 702, processing logic performs an NLP operation on the input text to determine a first domain associated with the condition and a second domain associated with the action. In operation 703, processing logic determines a first API associated with the first domain and a second API associated with the second domain. In response to a signal or notification received from a first application via the first API, in operation 704, processing logic determines whether the condition has been satisfied based on the signal or notification. If the condition has been satisfied, in operation 705, processing logic transmits a command to a second application via the second API to request the second application to perform the action.

Figure 8:
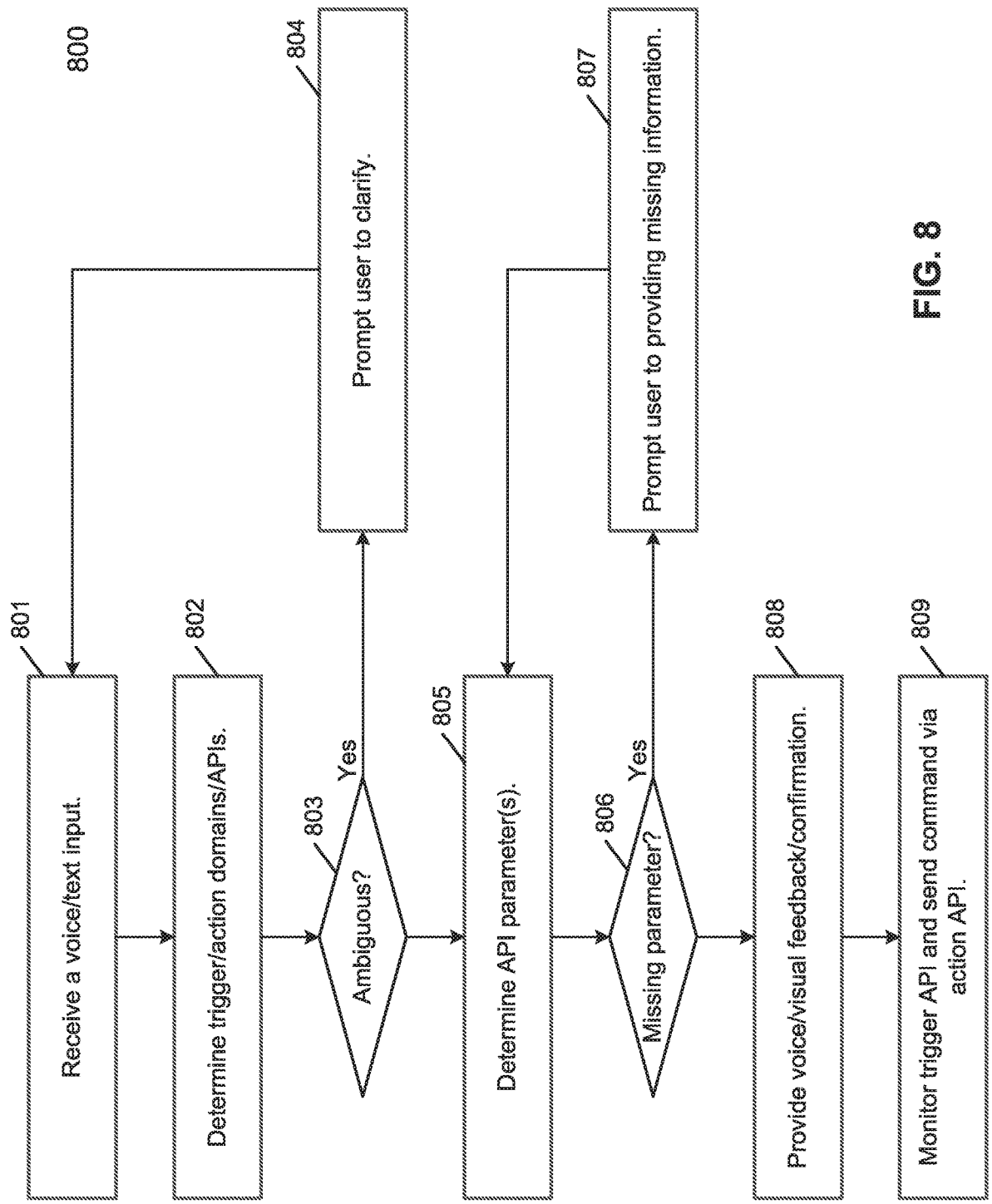
FIG. 8 is a flow diagram illustrating a process of performing tasks based on user inputs using natural language processing according to another embodiment.

FIG. 8 is a flow diagram illustrating a process of performing tasks based on user inputs using natural language processing according to another embodiment. Process 800 may be performed by processing logic which may include software, hardware, or a combination thereof. For example, process 800 may be performed by system 200 of FIG. 2. Referring to FIG. 8, in operation 801, processing logic receives a text input. The text input may be converted from a voice phrase or sentence spoken by a user or a recorded audio stream using speech recognition. Alternatively, the input text may be received over a communication channel (e.g., email, text). In response to the input, in operation 802, processing logic examines the input to interpret and determine trigger and action domain APIs.

In operation 803, processing logic determine whether there is any ambiguity regarding the domains associated with the input. If so, in operation 804, processing logic prompts the user to clarify and resolve the ambiguity. Otherwise in operation 805, processing logic determines API parameters for the domain APIs. In operation 806, processing logic determines whether there is any parameter missing. If so, in operation 807, processing logic may prompt the user for missing parameter. Alternatively, processing logic invokes an external information provider or third-party vendor to obtain the missing parameters. Otherwise in operation 808, processing logic optionally provides audio and/or visual feedback to the user to confirm what the system understands and the actions will be performed. In operation 809, processing logic monitor a trigger API and in response to a trigger event, performs the configured action via an action API.

Figure 9:
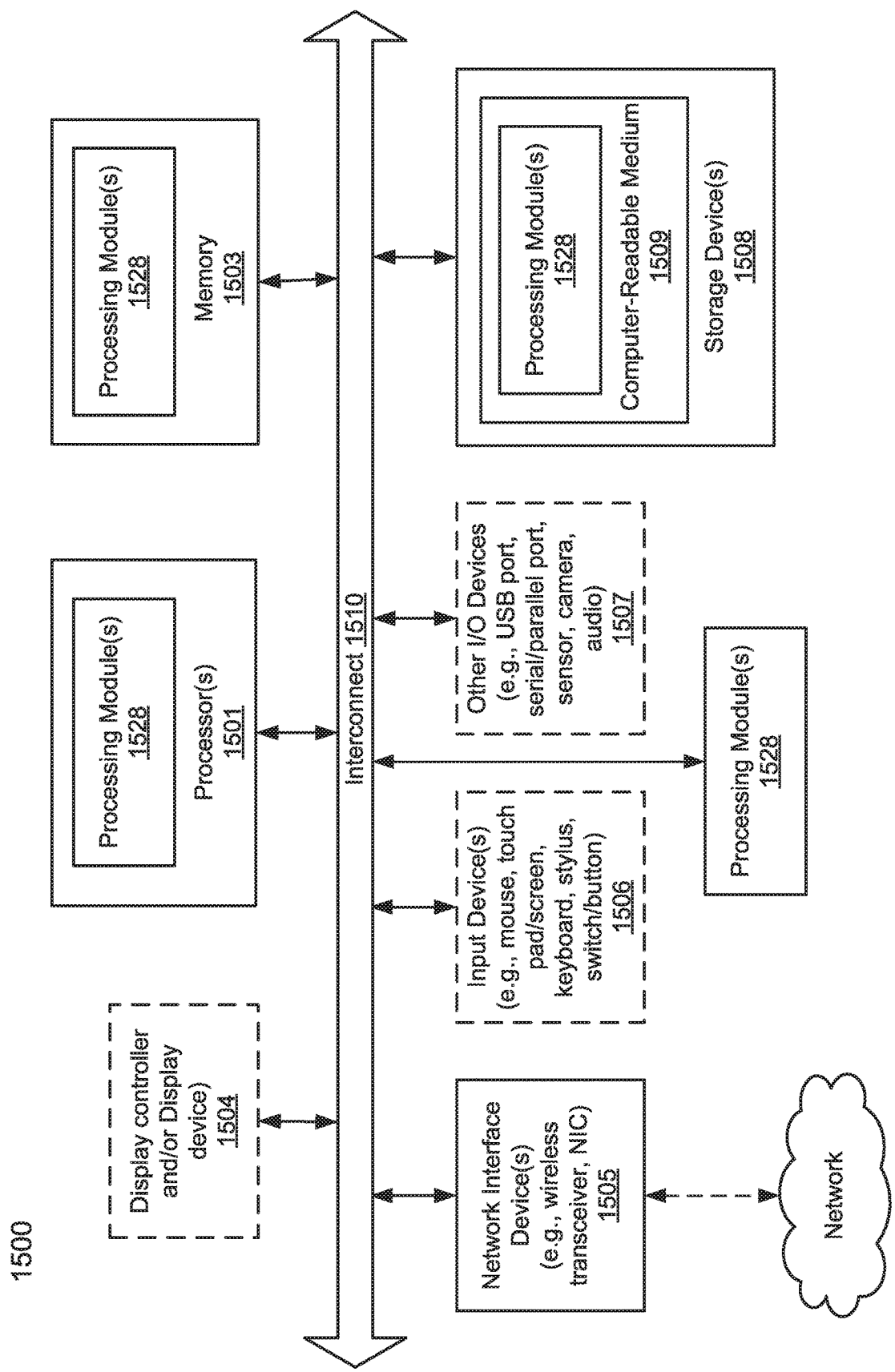
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, a client device or a server described above, such as, for example, system 200 of FIG. 2 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, NLU system 110 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for automatically performing tasks based on user inputs, the method comprising:

in response to an input text originated from a user, performing a natural language processing (NLP) operation on the input text to determine a task to be performed in response to a condition relating to an event that may take place at a later time, wherein the condition is satisfied if and when the event takes place at the later time;

determining a first domain associated with the condition based on the NLP operation;

determining a second domain associated with the task to be performed based on the NLP operation;

determining a first application programming interface (API) associated with the first domain and a second API associated with the second domain;

parsing the input text to determine one or more parameters of the first API and the second API;

receiving a notification from a first application via the first API;

examining the notification received from the first API to determine whether the condition has been satisfied; and in response to determining at the later time, that the condition has been satisfied, transmitting a control command to a second application via the second API, the control command requesting the second application to perform the task.

2. The method of claim 1, wherein determining a first domain associated with the condition and a second domain associated with the task comprises predicting the first domain and the second domain using a predetermined domain predictive model.

3. The method of claim 1, wherein determining the second API comprises:

searching in a domain-to-API mapping table based on the second domain to locate a mapping entry that matches the second domain; and obtaining the second API from the matching mapping entry.

4. The method of claim 3, wherein the domain-to-API mapping table comprises a plurality of mapping entries, wherein each mapping entry maps a domain to one or more APIs.

5. The method of claim 3, further comprising:

determining whether there are multiple APIs corresponding to the second domain listed in the matching mapping entry; and prompting the user to select one of the APIs associated with the second domain, wherein the control command is transmitted via the selected API.

6. The method of claim 3, further comprising:

determining whether a parameter of the control command is missing based on the NLP operation of the text input; and in response to determining that there is a parameter missing from the control command, prompting the user to provide the missing parameter.

7. The method of claim 1, further comprising:

receiving a voice input having a voice command originated from the user; and performing a speech recognition on the voice stream to transcribe the voice input to generate the input text.

8. A non-transitory machine-readable medium having instructions stored therein, which when executed by a processor, cause the processor to perform operations, the operations comprising:

in response to an input text originated from a user, performing a natural language processing (NLP) operation on the input text to determine a task to be performed in response to a condition relating to an event that may take place at a later time, wherein the condition is satisfied if and when the event takes place at the later time;

determining a first domain associated with the condition based on the NLP operation;

determining a second domain associated with the task to be performed based on the NLP operation;

determining a first application programming interface (API) associated with the first domain and a second API associated with the second domain;

parsing the input text to determine one or more parameters of the first API and the second API;

receiving a notification from a first application via the first API;

examining the notification received from the first API to determine whether the condition has been satisfied; and in response to determining, at the later time, that the condition has been satisfied, transmitting a control command to a second application via the second API, the control command requesting the second application to perform the task.

9. The machine-readable medium of claim 8, wherein determining a first domain associated with the condition and a second domain associated with the task comprises predicting the first domain and the second domain using a predetermined domain predictive model.

10. The machine-readable medium of claim 8, wherein determining the second API comprises:

searching in a domain-to-API mapping table based on the second domain to locate a mapping entry that matches the second domain; and obtaining the second API from the matching mapping entry.

11. The machine-readable medium of claim 10, wherein the domain-to-API mapping table comprises a plurality of mapping entries, wherein each mapping entry maps a domain to one or more APIs.

12. The machine-readable medium of claim 10, wherein the operations further comprise:

determining whether there are multiple APIs corresponding to the second domain listed in the matching mapping entry; and prompting the user to select one of the APIs associated with the second domain, wherein the control command is transmitted via the selected API.

13. The machine-readable medium of claim 10, wherein the operations further comprise:

determining whether a parameter of the control command is missing based on the NLP operation of the text input; and in response to determining that there is a parameter missing from the control command, prompting the user to provide the missing parameter.

14. A data processing system, comprising:

a processor; and a memory coupled to the processor to store instructions, which when executed by the processor, cause the processor to perform operations, the operations including:

in response to an input text originated from a user, performing a natural language processing (NLP) operation on the input text to determine a task to be performed in response to a condition relating to an event that may take place at a later time, wherein the condition is satisfied if and when the event takes place at the later time, determining a first domain associated with the condition based on the NLP operation, determining a second domain associated with the task to be performed based on the NLP operation, determining a first application programming interface (API) associated with the first domain and a second API associated with the second domain, parsing the input text to determine one or more parameters of the first API and the second API, receiving a notification from a first application via the first API;

examining the notification received from the first API to determine whether the condition has been satisfied, and in response to determining, at the later time, that the condition has been satisfied, transmitting a control command to a second application via the second API, the control command requesting the second application to perform the task.

15. The system of claim 14, wherein determining a first domain associated with the condition and a second domain associated with the task comprises predicting the first domain and the second domain using a predetermined domain predictive model.

16. The system of claim 14, wherein determining the second API comprises:

searching in a domain-to-API mapping table based on the second domain to locate a mapping entry that matches the second domain; and obtaining the second API from the matching mapping entry.

17. The system of claim 16, wherein the domain-to-API mapping table comprises a plurality of mapping entries, wherein each mapping entry maps a domain to one or more APIs.

18. The system of claim 16, wherein the operations further comprise:

determining whether there are multiple APIs corresponding to the second domain listed in the matching mapping entry; and prompting the user to select one of the APIs associated with the second domain, wherein the control command is transmitted via the selected API.

19. The system of claim 16, wherein the operations further comprise:

determining whether a parameter of the control command is missing based on the NLP operation of the text input; and in response to determining that there is a parameter missing from the control command, prompting the user to provide the missing parameter.

\* \* \* \* \*